420-122 EX
C5142 OR RE 20,800
Examin
July 19, 1938. R. S. DEAN Re. 20,800
FERROUS ALLOY Orig. 1,904,859
Original Filed March 24, 1930 3 Sheets-Sheet 1
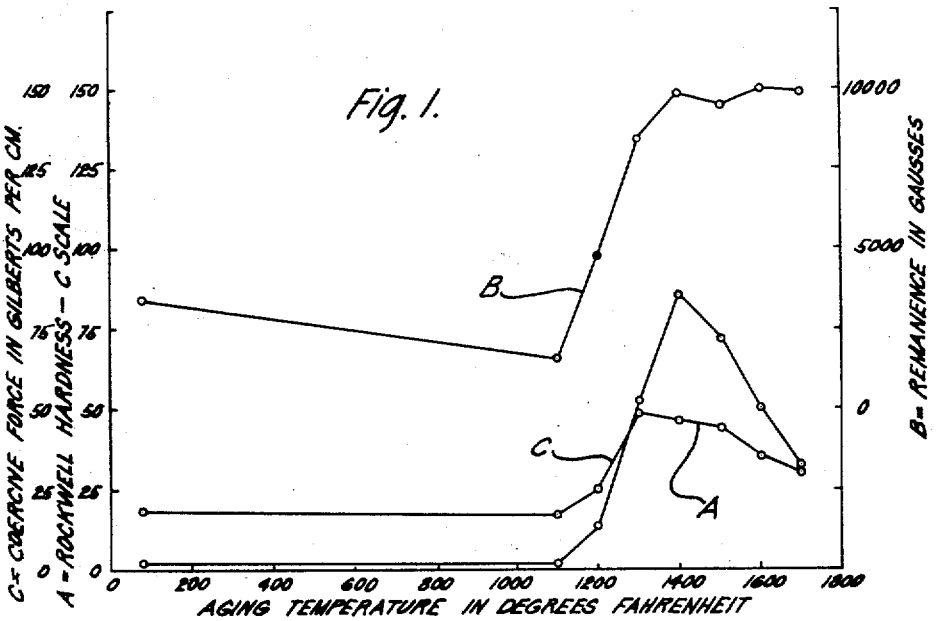
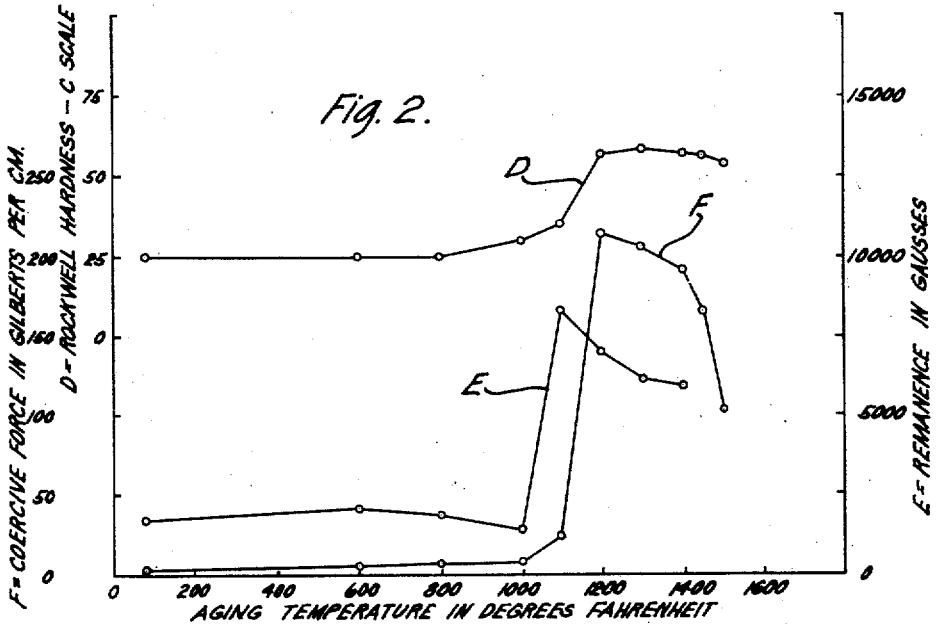
Inventor
R. S. Dean
By J. E. Roberts Att'y.

Examiner
July 19, 1938. R. S. DEAN Re. 20,800
FERROUS ALLOY
Original Filed March 24, 1930 3 Sheets-Sheet 2
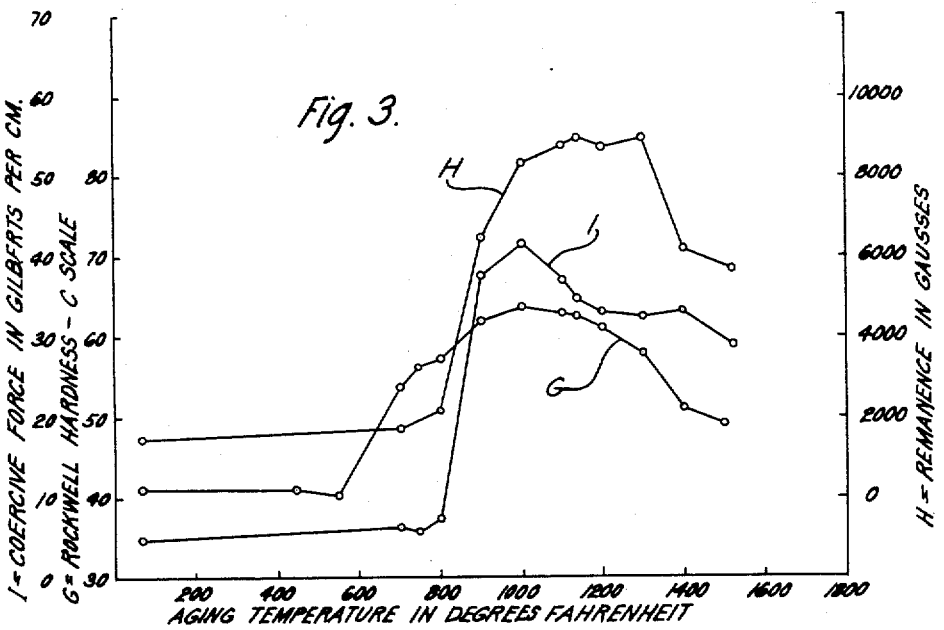
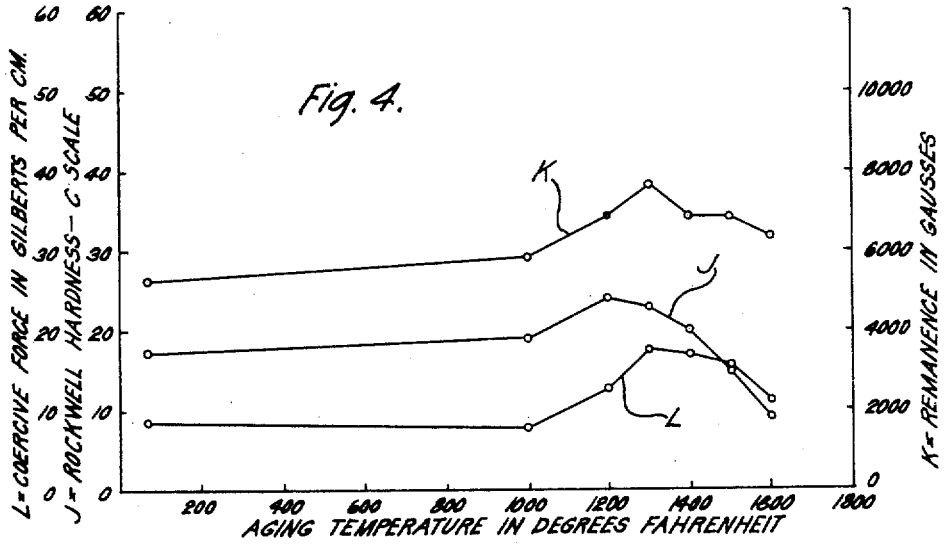
Inventor
R. S. Dean
By J. G. Roberts Att'y.

Examiner
July 19, 1938. R. S. DEAN Re. 20,800
FERROUS ALLOY
Original Filed March 24. 1930 3 Sheets-Sheet 3
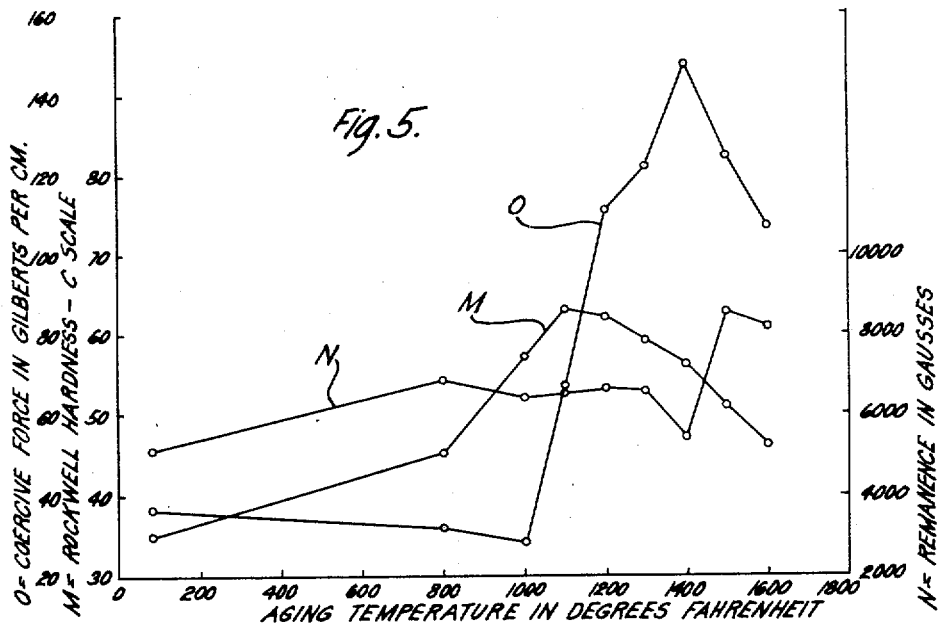
Inventor
R. S. Dean
By J. G. Roberts Att'y.

Reissued July 19, 1938

Re. 20,800

UNITED STATES PATENT OFFICE 20,800

FERROUS ALLOY

Reginald S. Dean, Washington, D. C., assignor, by mesne assignments, to Carboloy Company, Inc., a corporation of New York Original No. 1,904,859, dated April 18, 1933, Serial No. 438,263, March 24, 1930. Application for reissue December 17, 1934, Serial No. 757,978

28 Claims. (Cl. 148—21.5)

This invention relates to ferrous alloys and methods of producing the same, and more particularly to alloys of iron with tungsten, molybdenum, beryllium, and tantalum, and to methods of treating such alloys so as to produce certain desirable mechanical and magnetic characteristics.

An object of the invention is to provide an alloy in which certain desirable physical and magnetic properties are produced by special treatment.

In accordance with the general features of the invention as embodied in one specific form thereof, a quantity of iron, preferably substantially free of carbon, is alloyed with one or more of the above named alloy ingredients, and the mass is then cast in the form of ingots, which are then formed by forging or other means into any desired shape, or such shapes may if desired be formed directly from the molten metal. The forgings are then heated to a temperature just below the eutectic point of the alloy, and this temperature is maintained for a sufficiently long period of time to cause substantially all of the resulting solute constituent to enter solution in the iron, and the alloy is then quenched at a sufficiently rapid rate to cause the solute constituent to remain in the iron in the form of a supersaturated solid solution, after which the alloy is caused to assume a more stable state by aging. The hardness of the alloy as quenched may be increased considerably by such aging, and the secondary hardness is retained even at elevated temperatures. In the manufacture of articles such as dies or permanent magnets from alloys of the type just described, an article may be forged or otherwise formed from the alloy and the formed article then subjected to the above outlined heating, cooling, and aging operations.

The above described and other objects and features of the invention will be apparent from the following detailed description, taken in connection with the accompanying drawings, in which Fig. 1 is a graphic representation of certain phenomena encountered in the aging of an iron-tungsten alloy containing 21.1% of tungsten;

Fig. 2 is a similar representation of the properties of an iron-molybdenum alloy containing 23.4% of molybdenum;

Fig. 3 is a similar representation of the properties of an iron-beryllium alloy containing 2.8% of beryllium;

Fig. 4 is a similar representation of the properties of an iron-tantalum alloy containing 24% of tantalum; and Fig. 5 is a similar representation of the properties of a quaternary alloy containing approximately 25.7% cobalt, 20.1% tungsten, 6.4% manganese, and the remainder iron.

This invention is based on the discovery that the mechanical properties of the above named alloys, as well as the magnetic remanence and coercive force, may be greatly increased by a proper heat treating process, and the magnetic characteristics of the alloy will not necessarily vary with its physical hardness.

Although it is not known with certainty what the solute constituents of these alloys are, it is believed that the alloy ingredient combines chemically with a part of the iron to form a compound which remains in a dispersed phase throughout the iron and may under certain conditions be precipitated in the form of microscopic or submicroscopic particles dispersed throughout the alloy. The various steps constituting the processes described below are the same regardless of whether the alloy ingredient is dissolved in the iron as an element or as a compound, and it is to be understood, therefore, that in the following description and appended claims the term "solute constituent" may include the alloy ingredient either combined or uncombined as the case may actually be.

In practicing one method of producing alloys in accordance with the invention, a quantity of tungsten, molybdenum, beryllium or tantalum greater than that which will enter solution in iron at room temperature, but not substantially more than is soluble at the eutectic temperature, is alloyed with iron and the resulting alloy is caused to solidify. The alloy is then heated at a temperature dependent upon which alloy ingredient is used until a substantially homogeneous solid solution is formed, and is then quenched at a rate sufficiently rapid to cause most or all of the alloy ingredient to be retained in the iron in the form of a supersaturated solid solution, and the alloy is subsequently aged at a temperature considerably below the eutectic temperature. The proper length of time and temperature of the solution forming step, quenching or supersaturating step, and the aging step, wherein the alloy is allowed to assume a more stable state, together with the proper proportions of iron and alloy ingredient, will vary with the properties desired in the alloy and the uses to which the alloy is to be put as well as with the particular alloy ingredient employed. However, the following example has been found to produce a satisfactory alloy for permanent magnets. To a substantially carbon-free iron is added 21.1 parts of tungsten, and the two ingredients are agitated in any known manner while in the molten state to produce a homogeneous alloy. The alloy is then cast into ingots and fabricated into desired shapes, which are then brought to a temperature (about 2600° F. in the case of tungsten) slightly below the eutectic temperature, and maintained at such temperature for a sufficient time to produce a solid solution of the tungsten in the iron. The parts are then quickly cooled by quenching, thus producing a supersaturated solid solution of the solute constituent in the iron. The parts are then heated to about 1400° F., and maintained at such temperature for a time varying from fifteen minutes to an hour, after which they are quenched either rapidly or slowly, the rate of cooling being immaterial. The alloy, after this treatment, will be found to have a magnetic remanence or coercive force higher than that of iron-tungsten alloys heretofore produced, and is suitable for use in permanent magnets. Referring to the drawings, curve B of Fig. 1 indicates the magnetic remanence obtained by treating the alloy at various temperatures for one hour, cooling, and then subjecting the parts to a magnetizing force of 1000 gilberts per centimeter. The coercive force is indicated in curve C, and mechanical hardness in curve A. All these characteristics are at or near a maximum when the alloy is aged at about 1400° F. An alloy aged at that temperature, in addition to having desirable magnetic characteristics, is suitable for use in dies for die casting machines and for analogous uses since it is capable of withstanding high temperatures without losing its hardness.

Fig. 2 illustrates the behavior of an iron-molybdenum alloy containing 23.4% of molybdenum, curve D representing the variation in hardness while curves E and F represent remanence and coercive force respectively. This alloy behaves similarly in most respects to the iron-tungsten alloy above discussed.

Fig. 3 illustrates the behavior of an iron-beryllium alloy containing 2.8% of beryllium, curve G representing the variation in hardness while curves H and I represent remanence and coercive force respectively. It will be noted that in the case of this alloy the remanence reaches its maximum value at a considerably higher aging temperature than the coercive force and hardness.

Fig. 4 illustrates the behavior of an iron-tantalum alloy containing 21.9% of tantalum, curve J representing the variation in hardness while curves K and L represent remanence and coercive force respectively, all of which characteristics reach their maxima at or near 1300° F.

Fig. 5 illustrates the behavior of a quarternary alloy containing approximately 25.7% cobalt, 20.1% tungsten, 6.4% manganese, and the remainder substantially carbon-free iron. The figure shows that the mechanical hardness, represented by curve M, reaches a maximum when the alloy is aged at a temperature of about 1100° F., whereas the remanence, represented by curve N, and the coercive force, represented by curve O, reach their maximum values at considerably higher aging temperatures. The figure also illustrates the possibility of adding alloy ingredients in addition to tungsten, molybdenum, beryllium, and/or tantalum to improve the mechanical characteristics of the alloy, even though the additional alloy ingredients do not themselves form age-hardenable alloys with iron.

Alloys produced in accordance with the process herein disclosed may be used for a variety of other purposes, and it is within the scope of this invention to add to the alloy more than one of the above named metals, as well as such other ingredients as may be found desirable to adapt the alloy to the special purposes to which it is to be put, thus producing ternary and quaternary alloys having such special properties as are necessary to meet special requirements.

It is to be understood that the invention is not limited to the precise temperatures and proportions mentioned herein, which may be varied considerably without departing from the spirit of the invention as defined in the appended claims.

What is claimed is:

1. The method of producing a permanent magnet which comprises alloying a metal of the group including tungsten, molybdenum, and tantalum with substantially carbon-free iron, shaping a mass of the alloy into the desired form, heating the alloy to form a substantially homogeneous solid solution, cooling the solution at a rate to form a supersaturated solution, heat treating the alloy to develop its magnetic properties, and subjecting the alloy to a magnetizing force to thereby magnetize the alloy.

2. A magnetic alloy of substantially carbon-free iron with about 21.9% of tantalum, said alloy resulting from the heat treatment at a temperature between 1200° F. and 1400° F. of a supersaturated solid solution of the tantalum in the iron whereby the optimum magnetic properties of the alloy are obtained.

3. An alloy of substantially carbon-free iron with about 25% cobalt and 20% tungsten, said alloy resulting from the heat treatment at a temperature of about 1400° F. of a supersaturated solid solution of the tungsten in the alloy whereby the properties of the alloy are improved.

4. An alloy of substantially carbon-free iron with about 25% cobalt, 23% molybdenum, said alloy resulting from the heat treatment at a temperature of about 1300° F. of a supersaturated solid solution of the molybdenum in the alloy whereby the properties of said alloy are improved.

5. An alloy of substantially carbon-free iron with about 25% cobalt and metal from a group consisting of tungsten, molybdenum and tantalum, said alloy resulting from the heat treatment of a supersaturated solution of metal of said group in the alloy whereby the properties of the alloy are improved.

6. A method of making an alloy which comprises alloying iron with cobalt and a metal of the group of tungsten, molybdenum, and tantalum, heating the alloy to substantially the eutectic temperature of the metal of the group, quenching the alloy to produce a supersaturated solution of the metal of the group in the alloy, and age-hardening the alloy at a temperature to disperse the metal of the group in the alloy.

7. A method of making an alloy which comprises alloying iron with cobalt and tungsten in which the cobalt is present in the order of 25% and tungsten in the order of 20%, heating the alloy to a temperature of approximately 2600° F. to form a solid solution of the tungsten in the alloy, quenching the alloy to form a supersaturated solution of the tungsten in the alloy, and age-hardening the alloy at a temperature of approximately 1400° F.

8. A method of making an alloy which comprises alloying iron with cobalt and molybdenum in which the cobalt is present in the order of 25% and molybdenum in the order of 23%, heating the alloy to a temperature of approximately the eutectic temperature of molybdenum to form a solid solution of the molybdenum in the alloy, quenching the alloy to form a supersaturated solution of the molybdenum in the alloy, and age-hardening the alloy at a temperature of approximately 1300° F.

9. A method of making an alloy which comprises alloying iron with cobalt, manganese, and a metal of the group of tungsten, molybdenum, and tantalum, heating the alloy to substantially the eutectic temperature of the metal of the group to form a solid solution of the metal of the group in the alloy, quenching the alloy to form a supersaturated solution, and age-hardening the alloy to disperse the metal of the group in the alloy.

10. A substantially carbon-free, precipitation hardened alloy consisting substantially of iron, cobalt and metal from a group consisting of tungsten and molybdenum.

11. A substantially carbon-free, precipitation hardened alloy consisting substantially of iron, cobalt and metal from a group consisting of tungsten and molybdenum, the iron being present in said alloy in greater quantity by weight than either the metal from said group or cobalt constituent.

12. A substantially carbon-free alloy capable of being precipitation hardened and consisting substantially of iron, cobalt and metal from a group consisting of tungsten and molybdenum.

13. A substantially carbon-free alloy capable of being precipitation hardened and consisting substantially of iron, cobalt, an appreciable amount and up to a few per cent of manganese and metal from a group consisting of tungsten and molybdenum.

14. A substantially carbon-free alloy capable of being precipitation hardened and consisting substantially of iron, cobalt and tungsten.

15. A substantially carbon-free alloy capable of being precipitation hardened and consisting substantially of iron, cobalt and tungsten, the iron being present in said alloy in greater quantity by weight than either the tungsten or cobalt constituent.

16. An alloy consisting substantially of iron, cobalt and metal from a group consisting of tungsten and molybdenum, said alloy comprising a solid solution of metal from said group in the iron and cobalt with metal from said group precipitated within said solid solution in the form of uniformly distributed minute particles.

17. The method of forming a hard alloy consisting substantially of carbon-free iron, cobalt and metal from a group consisting of tungsten and molybdenum which comprises quenching said alloy from a temperature at which a substantially homogeneous solid solution exists in said alloy and thereafter heating the alloy at a lower temperature to effect precipitation hardening thereof.

18. A substantially carbon-free, precipitation hardened magnetic alloy consisting substantially of iron, cobalt and metal from a group consisting of tungsten, molybdenum, and tantalum.

19. A substantially carbon-free magnetic alloy capable of being precipitation hardened consisting substantially of iron, cobalt and metal from a group consisting of tungsten, molybdenum, and tantalum.

20. A magnetic alloy consisting substantially of iron, cobalt and metal from a group consisting of tungsten, molybdenum, and tantalum, said alloy comprising a solid solution of metal from said group in the iron and cobalt with metal from said group precipitated within said solid solution in the form of substantially uniformly distributed minute particles.

21. The method of forming a magnetic alloy consisting substantially of carbon-free iron, cobalt and metal from a group consisting of tungsten, molybdenum, and tantalum, which comprises quenching said alloy from a temperature at which a substantially homogeneous solid solution exists in said alloy and thereafter heating the alloy at a lower temperature to develop the magnetic properties thereof.

22. The method of producing a precipitation hardened alloy which comprises alloying iron, cobalt and a metal of the group tungsten, molybdenum, and tantalum, and subjecting the alloy to a precipitation hardening heat treatment to cause a dispersion of minute particles containing metal of the group substantially uniformly throughout the iron.

23. A magnetic material comprising a precipitation hardened iron alloy containing cobalt and a quantity of metal of the group tungsten, molybdenum, and tantalum greater than that which will enter solid solution in iron at room temperature, but not substantially more than is soluble at the eutectic temperature.

24. A substantially carbon-free alloy of iron, cobalt and a metal of the group tungsten, molybdenum, and tantalum, characterized by having the metal from said group maintained in a supersaturated solid solution in the iron and cobalt, whereby the characteristics of the alloy may be improved by heating it to effect precipitation hardening thereof.

25. The method of improving an alloy composed of iron, cobalt and a metal of the group tungsten, molybdenum, and tantalum, which comprises heating the alloy at a temperature below its melting point but sufficiently high and for a period sufficiently long to produce a substantially homogeneous solid solution of its constituents, quenching said alloy, and reheating the alloy at a temperature sufficiently high and for a period sufficiently long to effect an improvement therein by precipitation hardening.

26. As a new article of manufacture, a magnet made of a substantially carbon-free precipitation hardened alloy of iron, cobalt and a metal of the group tungsten, molybdenum and tantalum.

27. As a new article of manufacture, a magnet made of a substantially carbon-free precipitation hardened alloy of iron, cobalt and molybdenum.

28. A permanent magnet resistant to temperature changes which comprises a ferromagnetic alloy magnetically stable against temperature changes up to about 700° C.

REGINALD S. DEAN.